Dec. 30, 1969  A. E. ST. JOHN  3,487,223
MULTIPLE INTERNAL REFLECTION STRUCTURE IN A SILICON DETECTOR
WHICH IS OBTAINED BY SANDBLASTING
Filed July 10, 1968

INVENTOR.
ALBERT E. ST. JOHN
BY Harry A. Herbert Jr.
George Fine
ATTORNEYS

United States Patent Office 3,487,223
Patented Dec. 30, 1969

3,487,223
MULTIPLE INTERNAL REFLECTION STRUCTURE IN A SILICON DETECTOR WHICH IS OBTAINED BY SANDBLASTING
Albert E. St. John, Newbury Park, Calif., assignor to the United States of America as represented by the Secretary of the Air Force
Filed July 10, 1968, Ser. No. 743,803
Int. Cl. H01j 3/14, 5/16, 39/12
U.S. Cl. 250—216                    3 Claims

ABSTRACT OF THE DISCLOSURE

A silicon photoconductor apparatus having improved efficiency in infrared radiation detection by sandblasting the reflective surface of the apparatus and thereby creating a near-infinite number of reflecting angles and a corresponding multiplication of the quantum energy yield.

BACKGROUND OF THE INVENTION

Figure 1:
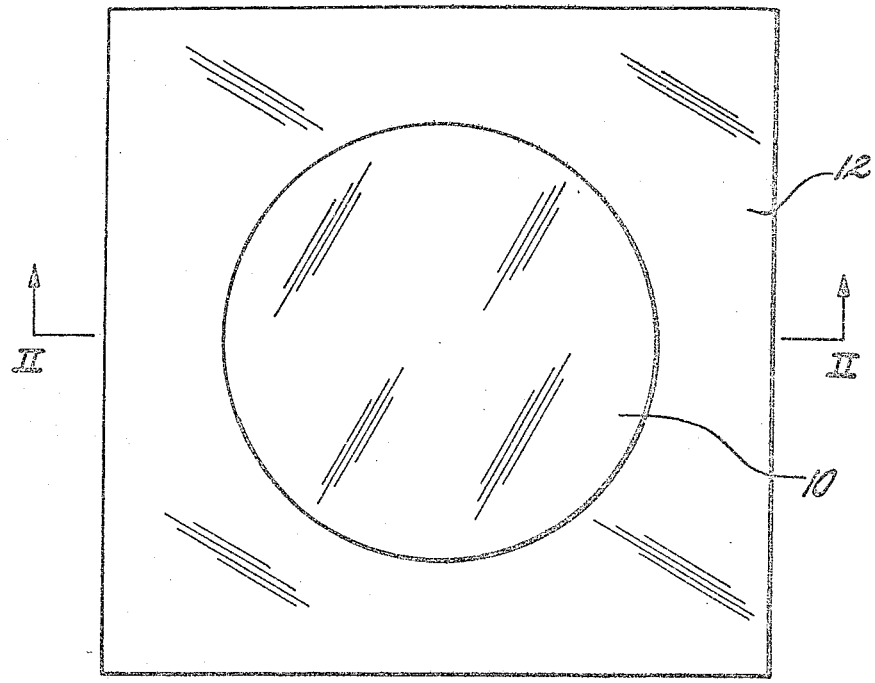

The development of efficient and powerful lasers at wavelengths of 1.06 microns ($\mu$) has stimulated interest in detectors operating at this wavelength. In typical silicon photodiodes, for detecting 1.06$\mu$ radiation, the requirements for high speed and high sensitivity are mutually exclusive. Since the absorption coefficient is only 25 cm.$^{-1}$, a 10$^{-1}$ cm. path length is required to absorb 92 percent of the incident 1.06$\mu$ radiation. However, if the electrode separation is any greater than 10$^{-2}$ cm., the minority carrier transit time will be greater than 1 nsec. This problem can be solved by allowing the incident light beam to make multiple passes between the electrodes. The optical path length can then be extended to several millimeters, as required for complete absorption, while the electrode separation remains less than 10$^{-2}$ cm., as required for nanosecond response time. In a typical photodiode geometry, one ohmic contact and one rectifying contact are formed on the two opposite surfaces of a base wafer, and the wafer thickness determines the electrode separation. The objective of the multiple reflection design is to allow all 1.06$\mu$ radiation to enter the detector front surface and to from the back detector surface so that no 1.06$\mu$ radiation can exit. Total internal reflection at the back detector surface is well suited for light trapping of 1.06$\mu$ radiation because the relatively large dielectric constant of silicon leads to a critical angle of 16.5° for total internal reflection. Detectors utilizing total internal reflection have been constructed in silicon.

Silicon photodiodes are widely used in the detection of visible and near infrared radiation. They can be readily designed to have high quantum efficiency (greater than 70 percent) for wavelengths from 5000 A. to 7500 A. and fast response time (less than 10$^{-9}$ sec.). A variety of such detectors are sold by various manufacturers. The main drawback with these typical photodiodes for detecting 1.06 micron radiation is that the requirements for high speed and high sensitivity are mutually exclusive.

Since the absorption coefficient is only 25 cm.$^{-1}$, a 10$^{-1}$ cm. path length is required to absorb 92 percent of the incident 1.06$\mu$ radiation. Yet if the electrode separation is any greater than 10$^{-2}$ cm., the minority carrier transit time will be greater than 1 nanosecond. The prior art attempts to solve the problem by utilizing a technique for obtaining multiple internal reflection in a silicon photodiode. This technique utilizes a machined prism-like dimple on the back surface of the silicon. Although effective in producing the desired internal reflection, this approach has proved to be costly, time-consuming, and limits the area over which reflection can be obtained.

SUMMARY OF THE INVENTION

The present invention describes an apparatus which achieves the same desired result, multiple internal reflection, with none of the attendant limitations of the dimple technique. The reflective surfaces are sandblasted over any desired area in a very short time with the simplest of equipment, forming, in effect, a myriad of dimples. This approach could be used with any crystalline photodetector to enhance the response to wavelengths not absorbed in typical geometries, as long as the increased absorption will result in additional photo-excited carriers. Thus a silicon photoconductor apparatus is provided which will cause multiple reflections of light, incident to its front surface, within its base material. The multiple light reflections within the photoconductor device produces both the high sensitivity and high speed required to detect 1.06$\mu$ radiation.

It is one object of the invention, therefore, to provide an improved silicon photoconductor apparatus having high sensitivity and high speed in the detection of 1.06$\mu$ radiation.

It is another object to provide a silicon photoconductor apparatus having a rough, sandblasted reflecting rear surface.

It is another object to provide a silicon photoconductor apparatus having a multiple total internal reflection for 1.06$\mu$ radiation.

It is yet another object to provide an improved silicon photoconductor apparatus having substantially higher quantum efficiencies which is economical to produce and utilizes conventional currently available materials that lend themselves to standard mass production manufacturing techniques.

These and other advantages, features and objects of the invention will become more apparent from the following description taken in connection with the illustrative embodiment in the drawings.

Figure 2:
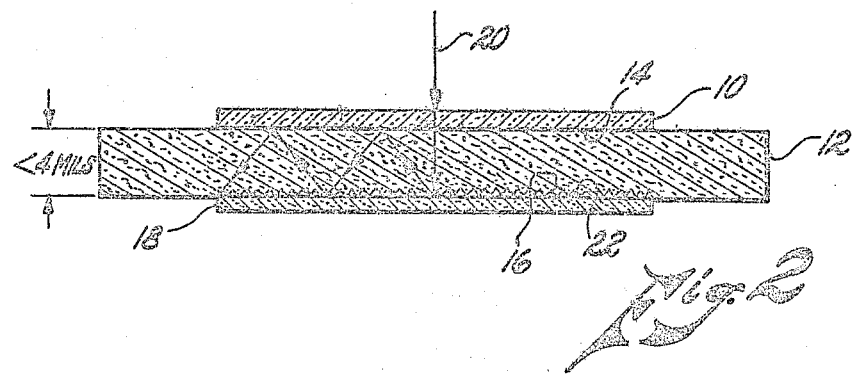

FIGURE 1 is a top plan view of the improved silicon photoconductor apparatus, and FIGURE 2 is a cross-sectional view of the device of the present invention shown in use with a light beam impinging thereon.

DESCRIPTION OF THE PREFERRED EMBODIMENT

As will be clear from the drawings, the multiple internal reflection structure in a silicon detector is highly superior to any other detectors currently available to detect 1.06$\mu$ radiation wtih high sensitivity and high speed. The silicon detector shown in FIGURE 1 with junction electrode 10 is positioned on the silicon base wafer 12. A more detailed explanation of the operation of the multiple internal reflection photoconductive detector will be given by referring to FIGURE 2 which is a cross-sectional view along line II—II of FIGURE 1.

FIGURE 2 shows a multiple reflective structure (i.e., one in which all incident 1.06$\mu$ radiation enters the front surface, but is totally internally reflected back into the detector at the back surface). The path length of the light beam at the end of one reflection in the detector is $$t + t/\cos 2\theta \qquad (1)$$

where $\theta$ is the angle of incidence of the light beam at the back detector surface, and $2\theta$ is the angle of incidence plus the angle of reflection. The general expression for the optical path length after $n$ internal reflections is $$d(n) = t(1 + n/\cos 2\theta) \qquad (2)$$

where $d(n)$ equals the optical path length after $n$ reflections, $t$ is the sample thickness, and $\theta$ is the internal angle of incidence at the back detector surface. Combining (1) and (2), the maximum quantum efficiency for a multiple reflective detector of thickness $t$ and $n$ reflections is $$QE_{max} = 100\%\{1-\exp-[at(1+n/\cos 2\theta)]\} \quad (3)$$

Quantum efficiency of a photodiode is dependent only on the absorption coefficient, therefore it follows from Lambert's law that $$QE_{max} = [100\% \; 1-\exp(-ad)] \quad (4)$$

where QE is the quantum efficiency in percent, $a$ is the absorption coefficient, $d$ is the optical path length. Equating Equations 3 and 4, we find that $d$, the optical path length, is directly proportioned to $t(1+n/\cos 2\theta)$. Thus, the greater the sample thickness, $t$ and the number of internal reflections, $n$, the optical path length $d$ will also be proportionately longer. Therefore, it can be seen from Equation 4 that as $d$ becomes larger, the expression $$[1-\exp(-ad)]$$

becomes larger and $QE_{max}$ is higher.

Referring now to FIGURE 2, prior to assembling the photoconductive silicon detector, the silicon base wafer 12 is processed to produce the multiple internal reflective structure 16. The silicon base wafer 12 may have a maximum thickness of 4 mils but in most applications, this thickness may be substantially smaller. This structure is extremely simple and could be utilized on almost any conceivable photodevice. The silicon base wafer 12 back surface is simply sandblasted in an air abrasive machine with a rough grit. This rough surface is waxed before the etching operation, so that it is not chemically polished. After etching, the silicon wafer 12 has one smooth surface (the front surface 24) and one rough surface (the rear reflecting surface 22). All angles between 16.5° and 90° produce total internal reflection; therefore, assuming a random collection of incidence angles, substantially all of the radiation reaching the back surface is totally internally reflected.

After the processing of the rear reflecting structure 16 has been completed and before the assembly of the photoconductive detector, an aluminized reflecting rear surface 22 is formed by any of the well-known deposition processes. Now the front electrode 10 and the lower electrode 18 may be applied to the silicon base wafer 12 by utilizing conventional semiconductor manufacturing techniques.

The incident light 20 strikes the front surface at 90° and is transmitted through the sample to the rear surface. When the incident radiation 20 strikes the irregular-shaped sandblasted rear surface 16 of the silicon base wafer 12, it is reflected through the silicon base wafer 12 toward the antireflective film 14. The radiation 20 is then reflected from the antireflective toward the sandblasted rear surface 16. It will be noted that the radiation 20 will be reflected a number of times before it is either totally absorbed by the base wafer 12 or escapes the reflecting surfaces. The critical angle in silicon is 16.5° and all radiation incident on the aluminized reflecting rear surface 22 at an angle greater than 8.25° will be internally reflected for at least two more passes through the base wafer 12. Assuming a random distribution of angles on the sandblasted rear surface 16 from 0° to 90°, then substantially all of the entering incident light will be internally reflected for two more passes through the silicon. The base resistivity is large enough that the sample is fully depleted for the voltage applied and also photo excited carriers are rapidly and completely collected. If a thin gold front electrode 10 is used in conjunction with a silicon oxide antireflection film 14, quantum efficiencies substantially higher than prior art devices may be realized with $1.06\mu$ radiation. Quantum efficiencies in nonreflecting silicon structures at $1.06\mu$ are typically less than 10 percent.

In the manufacturing process of multiple-reflection silicon photoconductor devices, surface states and surface potentials were found to be more important than work function differences in determining the junction characteristics of our metal semiconductor diodes. Work function differences have an effect on these characteristics, however. For example, aluminum evaporated layers have never formed a junction on our n-type silicon base wafers; they always give ohmic characteristcis. Gold and chromium evaporated films always produce junctions on our etched n-type silicon wafers. The degree of junction perfection is dependent on pre-evaporation sample preparation procedure, and thus is dependent on the proper surface state formations. Good results have been consistently obtained with a long, slow etch followed by a boiling water treatment.

Although the invention has been described with reference to a particular embodiment, it will be understood to those skilled in the art that the invention is capable of a variety of alternate embodiments within the spirit and scope of the appended claims.

I claim:

1. A photoconductive silicon detector of radiation signals with the detector having a multiple internal reflection structure comprising in combination a silicon base wafer having front and rear surfaces, said rear surface being sandblasted to provide a random distribution of prism-shaped angles, an aluminized reflecting film deposited on said sandblasted rear surface with the combination of said sandblasted rear surface and said aluminized reflective film operating to form a multiple internal reflecting structure for said silicon base wafer, an antireflective film located on said front surface, said antireflective film being transparent to radiation incident to its surface and reflective for internal radiation at angles less than incidence, a thin gold film deposited on said antireflective film, said thin gold film being transparent and nonreflective and positioned to receive said radiation signals, and a metal electrode adjacent and connected to said aluminized reflecting film.

2. A photoconductive silicon detector as described in claim 1 wherein said silicon base wafer has a thickness in the region of 4 mils.

3. A photoconductive silicon detector as described in claim 1 wherein said antireflective film consists of silicon oxide.

References Cited

UNITED STATES PATENTS 2,768,265   10/1956   Jenness _____ 338—18

RALPH G. NILSON, Primary Examiner

T. N. GRIGSBY, Assistant Examiner

U.S. Cl. X.R.

250—83.3, 211; 338—18